United States Patent [19]

McClernon

[11] 3,915,497
[45] Oct. 28, 1975

[54] PLATFORM LIFT FOR FARM TRACTOR

[76] Inventor: Francis H. McClernon, P.O. Box 1601, Springfield, Mo. 65805

[22] Filed: Nov. 8, 1973

[21] Appl. No.: 414,096

[52] U.S. Cl. .............................. 298/21 R; 298/22 R
[51] Int. Cl.² .......................................... B61D 9/00
[58] Field of Search...... 298/19 R, 22 R, 22 J, 22 P, 298/22 B, 22 D, 21 R; 214/501

[56] References Cited
UNITED STATES PATENTS
1,510,762   10/1924   Busacker........................... 298/21 R
3,232,667   2/1966   Schweitzer........................ 298/21 R

*Primary Examiner*—Frank E. Werner
*Attorney, Agent, or Firm*—Cushman, Darby & Cushman

[57] ABSTRACT

An improved platform lift for use on a farm tractor with a hydraulic lift system, having a platform suspended rearwardly from the tractor by means of a pair of parallel support rods attached at one end below the axle of the tractor and extending rearwardly so as to be pivotally attached to the rear portion of the platform in such a manner that the platform can be tilted upwardly away from the tractor. Securing the support rods to the tractor is a pair of suspension rods having one end attached to the tractor above the rear axle and the other end attached to the support bars at a distance from the axle. A pair of extension arms is provided which are attached to the rearwardly extending arms of the Ferguson-type hydraulic lift system, and have at their opposite ends roller members which contact the underside of the platform. As the hydraulic lift system is operated, the roller member moves upwardly in an arc causing the platform to tilt at an angle such that will allow a load being carried thereon to slidingly disengage from the platform rearwardly of the tractor.

11 Claims, 8 Drawing Figures

PLATFORM LIFT FOR FARM TRACTOR

BACKGROUND OF THE INVENTION

This invention relates to an attachment to farm tractor or the like, and more particularly to a platform lift which can be operatively associated with a Ferguson or similar type of hydraulic lift system, to cause the platform to be tilted at an angle so as to remove a load therefrom.

The present invention is an attachment for a tractor which may be adjusted to fit various types of tractors and is intended to be operated by a Ferguson or similar type of hydraulic lift system which possesses, or can be adapted to possess, a pair of rearwardly extending parallel arms which move in an arc in the vertical plane behind the tractor.

The platform lift of the present invention is an improvement over the type of platform lift disclosed in my previous U.S. Pat. No. 2,735,651 in which the platform and its supporting members are secured directly to the drawbar lift or hydraulic lift system. The system of the present invention allows the platform lift to be tilted at a greater angle than the platform lift as described in my previously mentioned patent and also allows the platform lift to be rotated rearwardly while maintaining its back edge well above the ground so that a load contained thereon may be more easily deposited on the ground behind the tractor as the platform is tilted.

The adjustability of various components of the platform lift of the present invention allows the lift to be adapted to various sizes and types of tractors as well as various types of hydraulic lift systems commonly referred to as drawbar lifts.

The platform lift of the present invention has the advantage over my platform lift disclosed in my above-mentioned patent in that, additional support may be provided for the platform lift so as to allow it to carry greater loads. The additional support is provided by the suspension members which are attached, by means of an adapter, to the upper portion of the rear axle of the tractor and which are attached at opposite ends to the midportion of the main support member for the platform lift so as to provide a triangular bracing system which was not possible on my previous platform lift.

SUMMARY OF THE INVENTION

The above advantages of my present invention over similar types of prior art devices, including my own, are provided basically by means of a platform member which is disposable laterally rearwardly of a tractor, connected at its rearward end to a pair of support members also extending rearwardly from the tractor and attached to the underside of the rear axle, one near each outer end thereof internally of the wheels, a pair of suspension members being provided, each of which is attached above each end of the rear axle of the tractor, and at the opposite end of said suspension members is connected to the midportion of each of the support members, thus securing the support members in a lateral position rearwardly of the tractor. A pair of lift arm extension members are provided which are secured to the lift arms of a drawbar lift of the type commonly used on tractors and well known to those skilled in the art. The extension members extend rearwardly from the tractor so as to engage the bottom portion of the platform. As the drawbar lift is operated, the extension members swing upwardly through an arc thus moving along the bottom portion of the platform and causing it to tilt upwardly and rearwardly about its pivotal attachment to the support members.

The extension members as well as the support and suspension members are provided with adjustment means for allowing them to be attached to various types and sizes of tractors and draw bar lifts, and yet be maintained in appropriate operative relationship to one another so that the platform lift will function properly.

DETAILED DESCRIPTION OF THE PREFERRED EMBODIMENT

Figure 1:
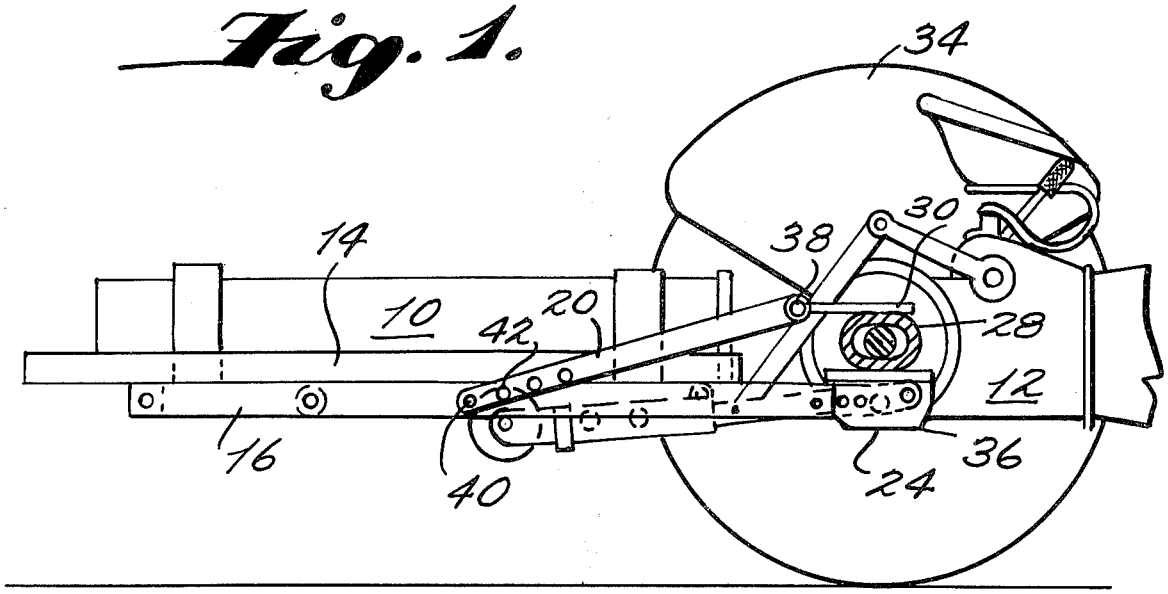
FIg. 1 is a side elevation in partial cross section of the preferred embodiment of the adjustable platform lift attachment of the present invention, showing the platform lift laterally disposed rearwardly from a tractor.

Shown in FIG. 1 is a platform lift attachment 10 connected to a tractor 12. A platform member 14 is supported rearwardly of tractor 12 by means of support members 16 and 18 and suspension members 20 and 22. Support members 16 and 18 are pivotally attached to brackets 24 and 26 which in turn are secured to lower portions of rear axle 28 of tractor 12 by means of U-bolts, or regular bolts where the rear axle of the tractor is of the type which has bolting positions at the particular locations at which adapter plates 24 and 26 are to be attached.

In the following description of the preferred embodiment, only the construction of one side of the invention will sometimes be referred to. Thus, where this occurs, it is to be noted that the same construction exists for the opposite side only in a mirror image of the side being described.

Figure 2:
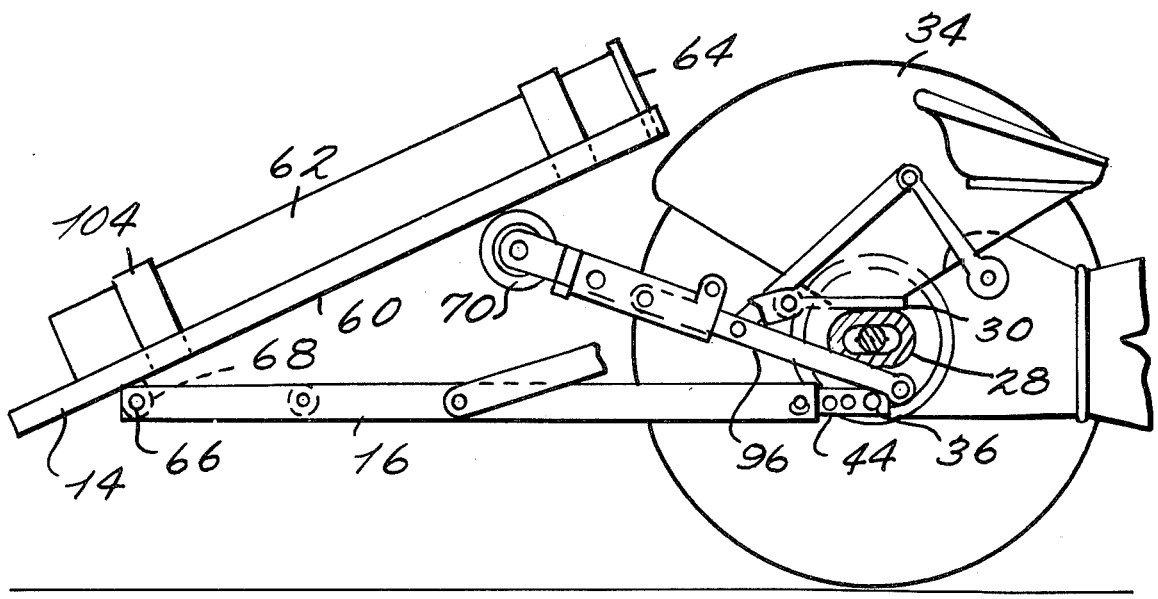
FIG. 2 is an elevational view in partial cross section of the embodiment of FIG. 1, showing the platform in a raised position.

Suspension bars 20 and 22 are pivotally connected at one end to adapter plates 30 and 32 which in turn are secured to upper portions of axle 28 by means of U-bolts, or regular bolts where the axle is provided with bolts or threaded holes in the appropriate location. The adapter plate 30, as shown in FIG. 2, is attached to the particular type of tractor shown by means of the same bolts provided with the tractor, or longer bolts utilized in the same position, for holding on the fender 34, and is positioned between fender 34 and axle 28. The pivotal connections between adapter 30 and suspension bar 20 and between support member 16 and adapter 24, can be pins or cylindrical members 36 and 38 which are secured to adapter plates 24 and 30 with a corresponding cylindircal opening in the end of suspension bars 20 and 22 or support members 16 and 18.

An opposite end of suspension bar 20 is pivotally attached to support member 16 by utilizing a pin 40 secured to support member 16 with a corresponding opening in suspension member 20. Additional holes 42 are provided along the end portion of suspension member 20 as to allow the suspension member to be attached to pin 40 in any of the holes 42 so as to suspend support member 16, and thus platform member 14 in its appropriate position behind different types of tractors.

Figure 3:
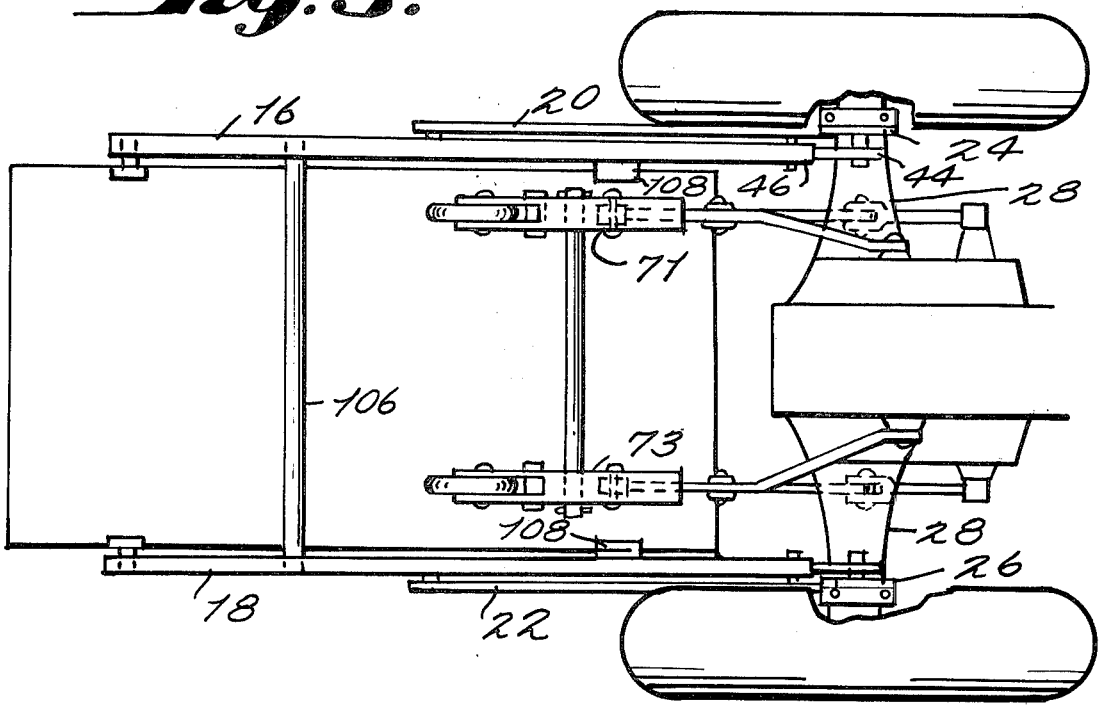
FIG. 3 is a bottom view of the embodiment shown in FIG. 1 as connected to a tractor and the drawbar lift.
Figure 8:
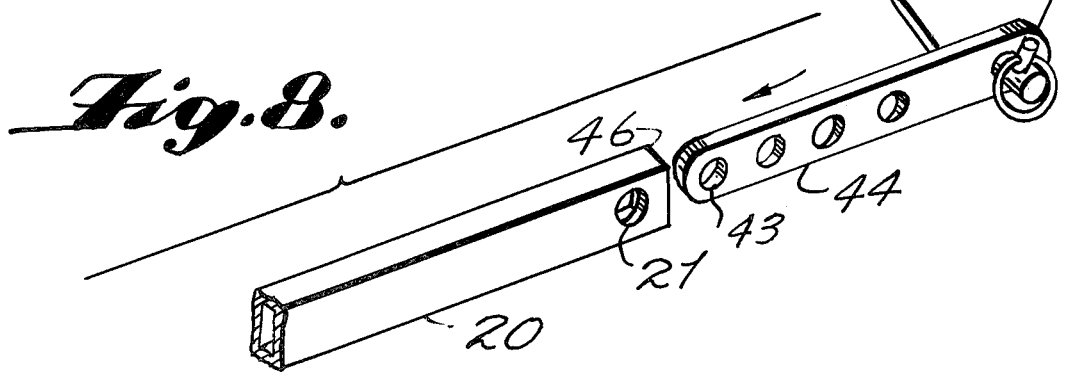
FIG. 8 shows an alternative embodiment in pictorial of a means for securing support members in an adjustable manner to a tractor.

Support member 16 may likewise contain additional cylindrical openings along its end portion for attachment to cylindrical member 36 so as to be properly suspended from various types of tractors. However, in the embodiment shown in FIGS. 1, 2 and 3, support member 16 is made of a hollow channelled steel (as more clearly shown in FIG. 8) having therein a rectangular cross section with a solid bar 44 slidably disposed and extending for a distance into the end portion 46 of support member 16. This allows support member 16 to be moved to any position relative to rear axle 28 so that suspension member 20 may be positioned in its appropriate relation to the support member 16. When this is accomplished hole 21 in the end of support member 16 can be aligned with an appropriate hole 43 and a pin (not shown) inserted through both to maintain the platform 14 in its appropriate relation to the ground.

Figure 5:
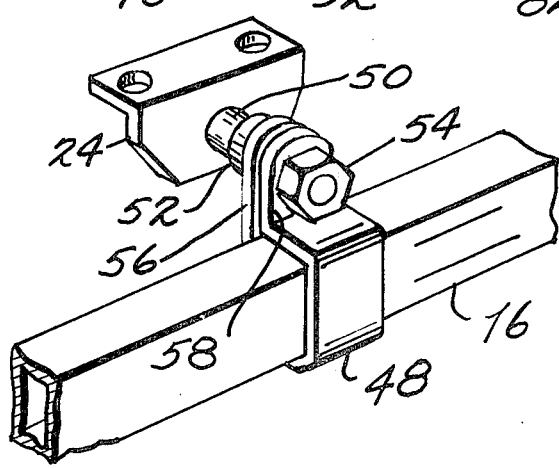
FIg. 5 is a pictorial illustration of an alternative means of attaching the support members of the present invention to a tractor.
Figure 6:
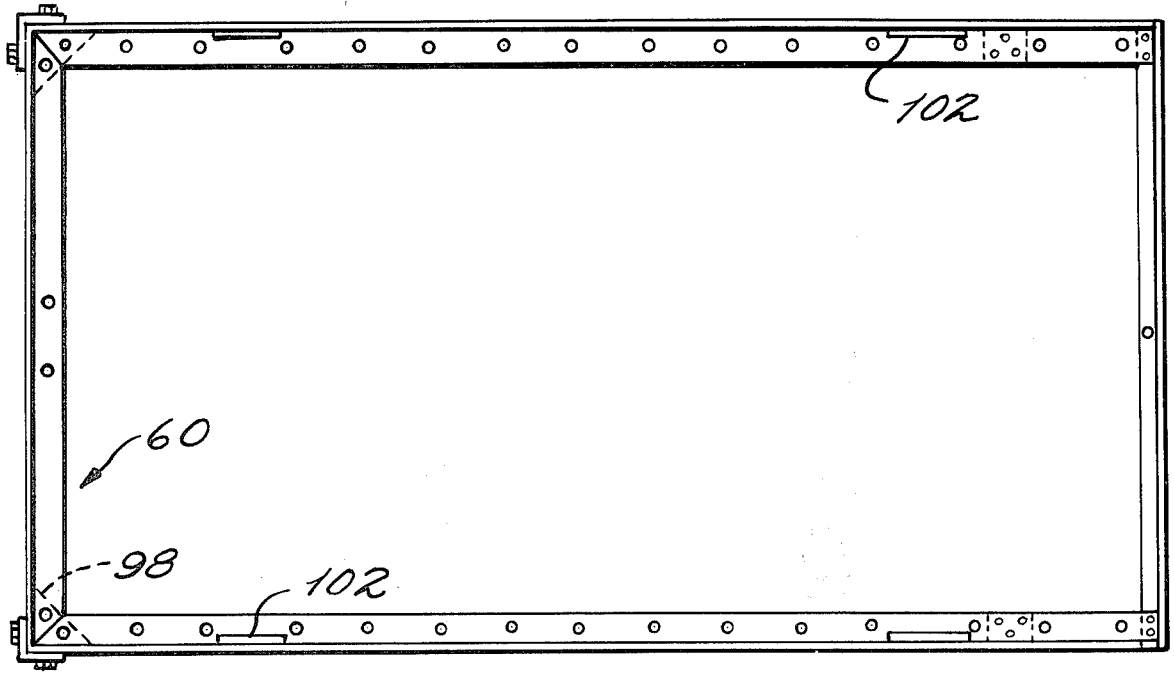
FIG. 6 illustrates a preferred construction of the platform of the present invention.
Figure 7:
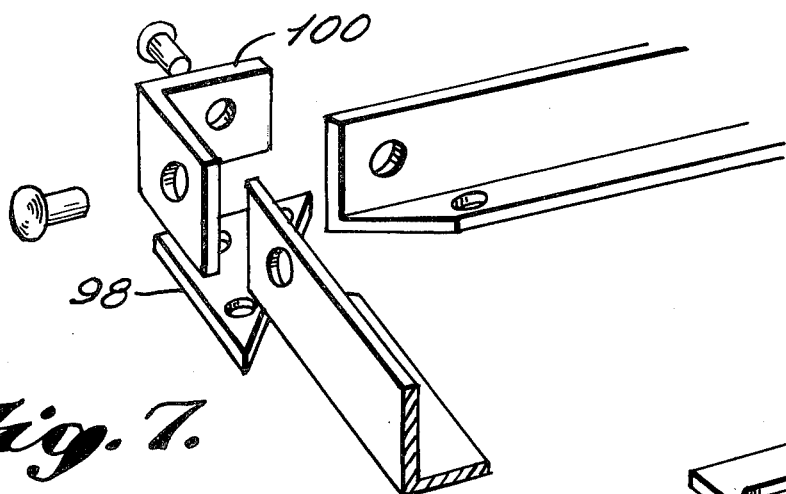
FIG. 7 shows an expanded pictorial view of a corner assembly of the platform construction illustrated in FIG. 6.

Another means for attaching support member 16 to adapter 24 is shown in FIG. 5, wherein the support member 16 is held in its appropriate position by means of a one-piece bracket 48. Bracket 48 is mounted on pin 50 which takes the place of cylindrical member 36 in the previously described embodiment. Pin 50 has a spacer member 52 which may be integral with pin 50 and which provides a stop for bracket 48 an appropriate distance away from adapter 24 for clearance. Bracket 48 is preferably formed from solid bar stock into the shape shown, which has an internal cavity corresponding in shape to support member 16. Bracket 48 is designed to grasp support member 16 when nut 54 is tightened so that legs 56 and 58 are pulled toward each other. When nut 54 is loosened, bracket 48 tends to expand, freeing support member 16 for movement therethrough. Thus, depending upon the type of tractor involved, suspension member 20 may be attached to support member 16 in the appropriate hole 42 and then bracket 48 can be tightened down, thus gripping support member 16 and holding it in its appropriate position.

Platform member 14 is illustrated as having a base platform 60 constructed from angle iron having an L-shape cross section which is disposed so that a wooden floor made up of planks or a single sheet of wood, such as plywood, may be positioned within the L-shape, supported thereby, and bolted thereto. Wooden side rails 62 and end rail 64 are attached to platform base 60 in a removable manner such as a stake and slot arrangement whereby a side member 62 and end member 64 may be easily removed from platform base 60. The additional side member 62 and end member 64 provide containment means for loads such as dirt so that they may be easily hauled on platform 14. Platform member 14 is pivotally attached to support members 16 and 18 by means of a rod 66 secured to support members 16 and 18 at the end portion thereof, and which extends through brackets 68 attached to each side of platform member 14. The holes in brackets 68 have adequate clearance for the rods 66 so as to allow the platform to be freely rotated thereabout.

Figure 4:
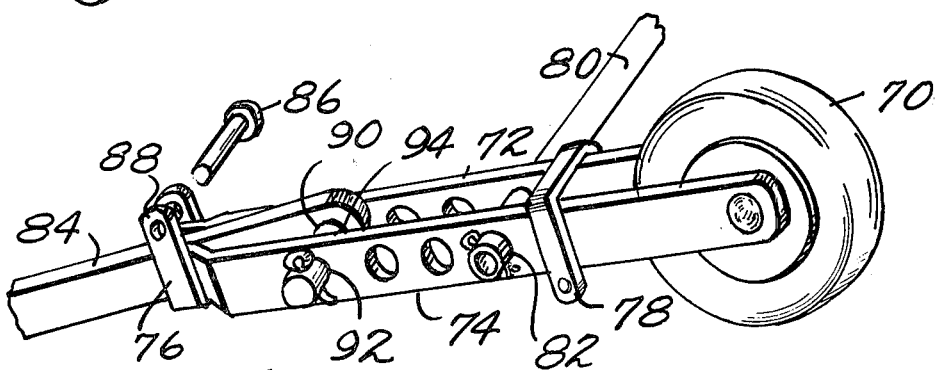
FIG. 4 is a pictorial view of an embodiment of the extension arm of the present invention as attached to a lift arm of a drawbar lift.

Lift arm extension members 71 and 73, one of which is illustrated in FIG. 4, basically comprise a roller 70, side extension bars 72 and 74 and U-shaped support brackets 76 and 78. The pair of lift arm extensions 71 and 73 can be interconnected for additional support by means of a bracing bar 80 which prevents loaded platform 14 from swaying while in transit, as shown in FIG. 4 as extending through one of the lift arm extensions and being maintained in appropriate relation thereto by means of pin 82. Brackets 76 and 78 are welded to side support members 72 and 74 to maintain these members in appropriate parallel relationship. Bracket 76 is welded to the end portions of side members 72 and 74 and maintains the end portion of the side members at an appropriate distance apart to allow the side members and bracket 76 to be slid over the lift arm 84. A pin 86 is inserted in the hole 88 to capture the lift arm within side members 72 and 74. The lift arm extension can be slide along the lift arm so as to allow pin 90 to be inserted through a hole 92 in the lift arm extension and a corresponding hole 94 in the lift arm so as to position the lift arm extension at the right distance in relation to the bottom of the platform base 60 so as to allow adequate angle of tilt to platform 14 to be sufficient to dump the load.

Referring again to FIG. 2, as the drawbar lift is operated, lift arm 96 is moved upwardly in an arc along with the lift arm extension, causing wheel 70 to roll upwardly along the bottom of platform base 60, thus causing the platform member 14 to be pivoted upwardly and rearwardly about rod 66. As the drawbar lift is operated in the reverse direction, wheel 70 moves rearwardly along platform base 60, thus lowering platform member 14 to its carrying position.

In order to provide additional support for platform base 60, if it is constructed from angle iron, triangular shaped plates 98 can be secured to the underside of the front corners of the platform by riveting or welding or the like and brackets 100 can be secured to the upright corners of the front portion of platform base 60 in a similar manner so as to provide vertical support. The two sets of brackets combine to reduce the flexure of the platform considerably. Slots 102 are provided to allow stakes 104 secured to side members 62 and end members 64 in the commonly known manner to secure the side members and end members to the platform.

Crossbar 106 can be provided which extends between support members 16 and 18, thus increasing the rigidity of the support members. In addition, platform stop brackets 108 are provided to support the platform member 14 when it is in the lateral position and which prevent the platform member from extending downwardly beyond a horizontal position when the lift arm extension members are lowered.

Although the foregoing description illustrates the preferred embodiment of the present invention, it will be apparent to those skilled in the art that variations are possible. All such variations as would be obvious to those skilled in this art are intended to be included within the scope of this invention.

What is claimed is:

1. A platform lift for use on a farm tractor having a hydraulic lift system, comprising:
   a platform member disposable laterally rearwardly of said tractor including,
   a rectangular frame constructed of L-shaped cross section channel members disposed so that the channel opens inwardly of said frame,
   a pair of frame bottom strengthening brackets substantially triangular in cross section and one attached to the underside of each forward corner of said frame,
   a pair of frame side strengthening brackets having an L-shaped cross section and one attached to the outside of the vertically extending leg of adjacent L-shaped channel members at each forward corner of said frame, and
   a floor member disposed within said frame and resting on and attached to the inwardly extending horizontal leg of said L-shaped cross-sectioned channel;
   support means rigidly attachable to said tractor and pivotally attached to said platform member for supporting said platform and a load disposed thereon so as to allow said platform to move from a hauling position wherein said load may be transported behind said tractor to a desired location, to a tilted position wherein said load would be caused to slide off of said platform member due to the inclination thereof; and
   tilting means attachable to said hydraulic system and disposed below said platform member in movable engagement therewith for causing said platform member to pivotally move from said hauling position to said tilted position as said hydraulic system is operated.

2. A platform lift for use on a farm tractor or the like having a hydraulic lift system, comprising:
   a platform member disposable laterally rearward of the tractor;
   support means rigidly attachable to the tractor and pivotally attached to a rear portion of the platform member for supporting the platform member and a load disposed thereon so as to allow the platform member to move between a hauling position wherein a front portion of the platform member is supported by the support means so as to distribute the weight of the load to the tractor where the support means is attached thereto, to a tilted position wherein the load is caused to slide off of the rear portion of the platform member remote from the tractor due to the inclination of the platform member; and
   tilting means attachable to the hydraulic lift system and including a pair of lift arm extensions substantially rigidly releasably attachable at one end of each to each of a pair of lift arms connected to the hydraulic lift system and having opposite end portions associated with the bottom of the platform member so as to swing through an arc adequate to cause the platform member to move between the hauling position and the tilted position when the hydraulic system is activated.

3. A platform lift as defined by claim 2 wherein said platform member has a flat bed and removable side board means and front board means attached thereto for containing a load such as earth therein.

4. A platform lift as defined in claim 2 wherein said support means includes a pair of support members disposable on opposite sides of said tractor for attachment thereto at one end portion of each said support member and pivotally attached to said platform member at the rear portion thereof at another end portion of each said support member, and
   a pair of suspension members disposable rearwardly of said tractor and attachable thereto, and disposed in angular relation and attached at one end of each to said support members, one to each so as to provide added support to said support members.

5. A platform lift as defined in claim 4 wherein each said support member is pivotally attachable at said one end portion below a rear axle of said tractor and extends above the ground substantially horizontally, said support members extending in parallel relation to each other, and
   each suspension member is pivotally attachable at another end portion thereof to said tractor above said axle and in parallel relation to each other.

6. A platform lift as defined in claim 6 wherein said suspension members include adjustment means at said one end portion thereof for allowing said platform member to be suspended in appropriate relation to different types of tractor.

7. A platform lift as defined by claim 4 wherein a pair of suspension brackets are provided one attached to each said suspension member at another end portion of each thereof and attachable to an upper portion of an axle of said tractor, and
   a pair of support brackets are provided one attached to each said support member at said one end portion thereof and attachable to a lower portion of said axle.

8. A platform lift as defined in claim 4 and further including a support member bracing bar disposed between and attached to said support members and perpendicular thereto so as to maintain said support members in substantially parallel relation.

9. A platform as defined in claim 1 wherein said tilting means further includes:
   means for rollingly engaging the bottom portion of said platform member in such a manner that when said extensions are moved upwardly through an arc said engaging means rolls towards an end of said platform member nearest said tractor so as to cause said platform member to pivot upwardly and rearwardly about said pivotal attachment to said support means and away from said tractor.

10. A platform as defined in claim 1 wherein said lift arm extensions are adjustably attachable to said lift arms so as to allow said extensions to be appropriately disposed in relation to said platform member on different types of tractors.

11. A platform as defined in claim 1 and further including a lift arm extension bracing bar disposed between and attached to said extensions and perpendicular thereto so as to maintain said extensions in substantially parallel relation to prevent lateral sway of said platform member.

* * * * *